Nov. 8, 1966  D. B. KUIPER  3,283,603
ACCESSORY OVERDRIVE CONTROL
Filed April 2, 1964  2 Sheets-Sheet 1
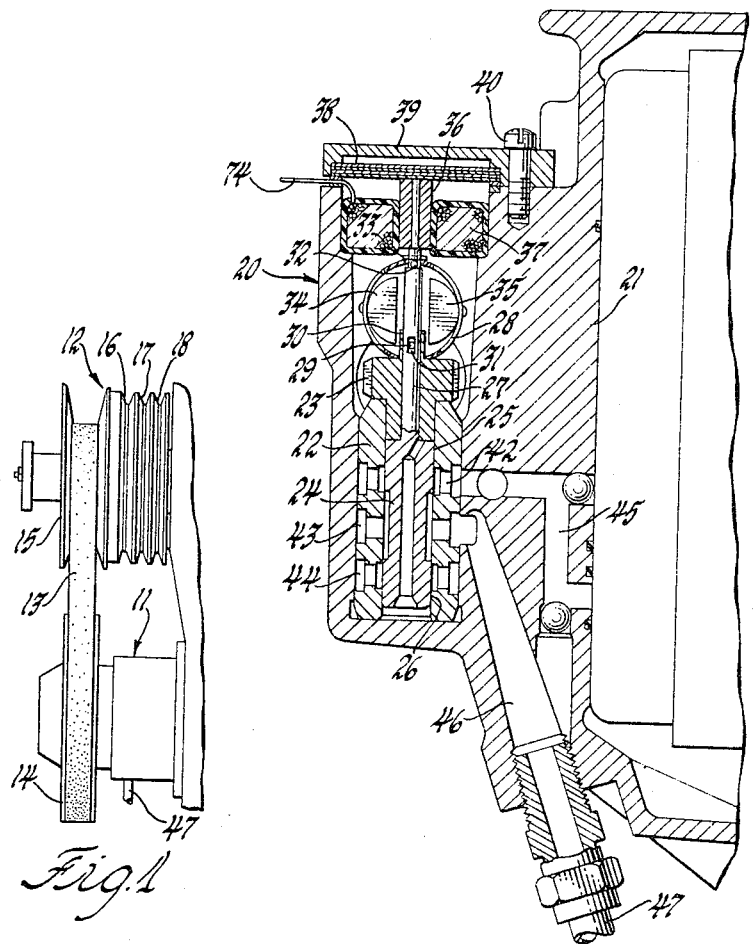
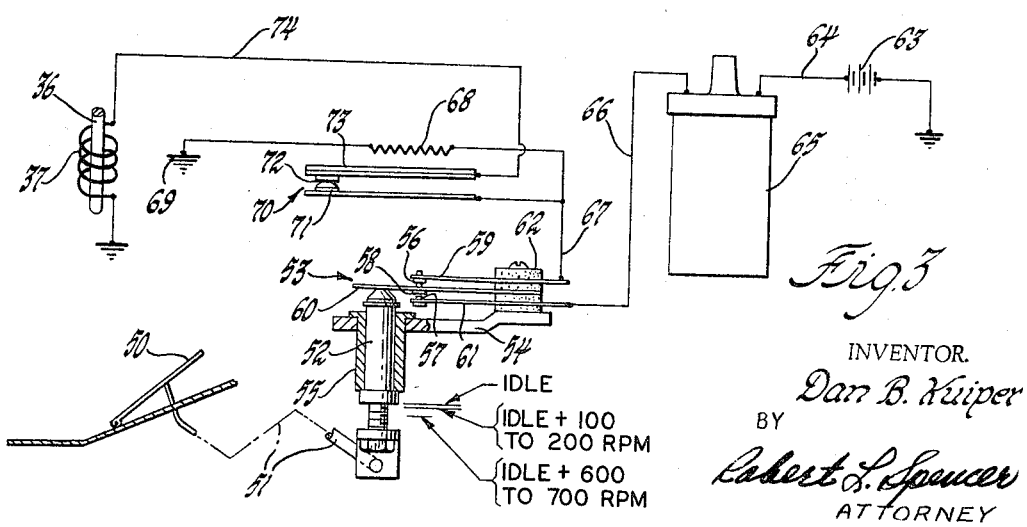
INVENTOR.
Dan B. Kuiper
BY
Robert L. Spencer
ATTORNEY Nov. 8, 1966

D. B. KUIPER 3,283,603

ACCESSORY OVERDRIVE CONTROL

Filed April 2, 1964

INVENTOR.
Dan B. Kuiper
BY
Robert L. Spencer
ATTORNEY

2

United States Patent Office 3,283,603
Patented Nov. 8, 1966

3,283,603
ACCESSORY OVERDRIVE CONTROL
Dan B. Kuiper, Grand Rapids, Mich., assignor to General Motors Corporation, Detroit, Mich., a corporation of Delaware
Filed Apr. 2, 1964, Ser. No. 356,727
10 Claims. (Cl. 74—472)

This invention relates to control systems for controlling variable speed drive mechanisms and more particularly to an improved control for an accessory drive mechanism of the type driven by a vehicle engine. In my copending application Serial Number 151,506, now U.S. Patent Number 3,157,066, there is shown an accessory drive structure wherein a governor driven at a speed proportioned to accessory speed is arranged to condition the accessory drive mechanism to drive the engine accessories at overdrive with respect to engine speed when the engine is at idle or relatively low speeds of rotation and to progressively reduce the accessory speed relative to engine speed in response to increase in speed of rotation of the accessories. Control systems as disclosed in my aforementioned application at times provide an undesirable overspeed of the accessories, particularly upon initial rapid advance of engine speed from an initial relatively slow engine speed such as idle condition of engine operation. This is because the control system is unable to respond rapidly enough to slow down the accessory speed upon such rapid advance of engine speed with the result that the accessories such as the fan and generator produce noise, and especially fan noise.

The present invention is particularly adapted to provide an accessory drive control constructed and arranged to prevent overspeeding of the engine driven accessories with respect to engine speed, particularly in periods of rapid acceleration of engine speed as occurs in initial vehicle acceleration.

An object of this invention is to provide in a control system of the type described, a vehicle speed responsive governor including a valve normally effective to deliver variable pressure to a servo associated with a variable diameter pulley and to provide additional manually controlled means operable to place the governor valve in a predetermined position when the manually controlled means is disposed in a predetermined position.

Another object of this invention is to provide in a control system of the type described, temperature responsive means for positioning the governor valve in a predetermined position independently of the manually controlled means when the temperature of the temperature responsive means is below a predetermined temperature.

A further object of this invention is to provide time delay means for transferring control of the governor valve from the manually controlled means to the speed responsive means associated with the governor.

An additional object of this invention is to provide in a control system of the class described a governor adapted to deliver variable pressure in response to speed responsive means, means for controlling the governor valve to place the valve in a predetermined position independently of the speed responsive means including a solenoid, a time delay means and a switch controlled by a vehicle engine accelerator pedal wherein the solenoid and time delay means are deenergized by the switch when the accelerator pedal is fully relaxed for engine idle operation, wherein the solenoid and time delay means are energized upon movement of the accelerator pedal into a first range of movement from the relaxed position and wherein the solenoid and time delay means and solenoid are again deenergized upon movement of the accelerator pedal into a second range of movement beyond said first range of movement to further advance engine speed.

These and other objects and advantages of this invention will be apparent from the following description and claims, taken in conjunction with the accompanying drawings in which:

FIGURE 1 is a schematic diagram of a pair of variable diameter pulleys wherein a servo associated with one of the pulleys is adapted to receive variable pressure from a governor to change the drive ratio between the pulleys.

FIGURE 2 is a sectional view of a governor driven by one of the pulleys and including a solenoid and speed responsive means for controlling the position of the governor valve.

FIGURE 3 is a schematic diagram of a control system for controlling the operation of the governor.

Figure 4:
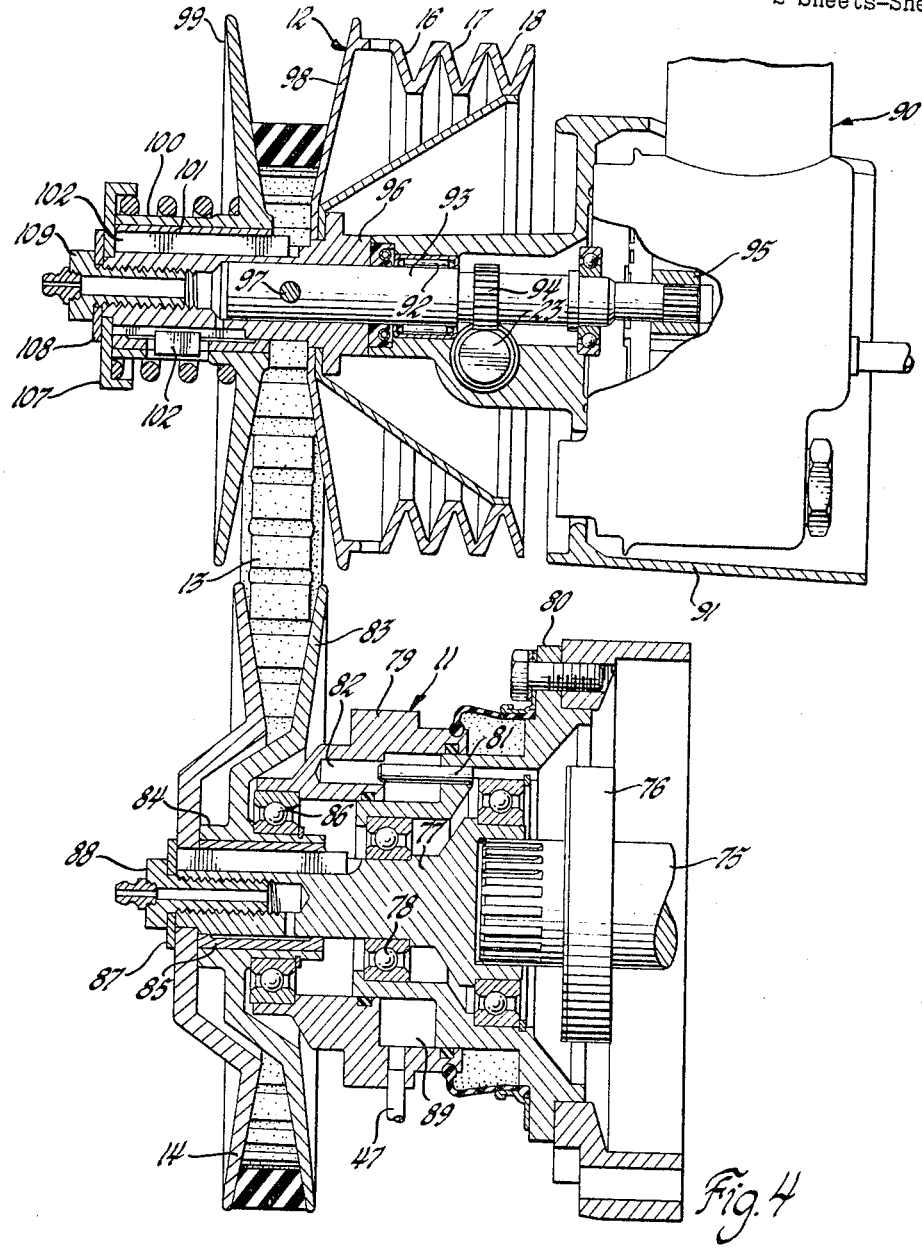
FIGURE 4 is a sectional view through the accessory drive illustrating the details of the structure of an actuator unit and drive ratio control unit of FIGURE 1.

Referring to FIGURE 1, there is shown in schematic form an actuator assembly generally indicated at 11 and a control assembly generally indicated at 12. Actuator assembly 11 is driven by a vehicle engine crankshaft (not shown) and is connected to control assembly 12 by means of a belt 13. Pulley sheaves 16, 17, and 18 rotate at the speed of rotation of control assembly 12 and drive the vehicle accessories such as the engine fan, generator and power steering pump (not shown) by means of belts (not shown). All of the details of the belt drives for the engine accessories, the details of the control unit assembly 12 and actuator assembly 11 are shown in my copending application for United States patent Serial Number 151,506. Accordingly, it is not believed necessary to illustrate these details herein. It is believed sufficient to say that the drive ratio between actuator unit 11 and control unit 12 may be varied by varying the fluid pressure supplied to actuator unit 11 through a passage 47. Actuator unit 11 includes a fluid pressure responsive servo piston (not shown) adapted to receive fluid under variable pressure through passage 47. In the absence of fluid pressure supplied to actuator unit 11, the control unit 12 will be driven at underdrive speed with respect to the speed of rotation of actuator unit 11 and the vehicle engine. Governor means shown in FIGURE 2 and driven by control unit 12 is adapted to deliver variable pressure which decreases with increase in speed of rotation of control unit 12 to progressively reduce the speed of rotation of unit 12 with respect to engine speed as the speed of rotation of unit 11 increases. Thus, at engine idle speed, governor 20 delivers maximum pressure to passage 47 such that unit 12 will be driven at maximum overdrive ratio with respect to speed of rotation of unit 11. The operation and structure of units 11 and 12 are the same as the actuator and control units of my copending application heretofore identified.

The present invention provides a modified governor and governor control for preventing excessive speeds of rotation of control unit 12 and the accessories driven thereby, particularly in periods of rapid engine acceleration from an engine idle condition of operation. It will readily be understood that in accelerating a vehicle particularly from a standing start and with the vehicle transmission (not shown) in low gear, that the vehicle engine initially rapidly accelerates to rather high engine speeds of rotation. With overdrive operation of unit 12, the accessories are rapidly accelerated to abnormally high initial speeds before the actuator unit 11 is able to respond to the control signal from control unit 12 to reduce the speed of rotation of unit 12 relative to that of unit 11. The present invention provides a control for preventing this undesirable initial overspeed condition of operation.

Referring to FIGURE 2, there is shown a governor indicated generally at 20 and adapted to be driven at a speed proportional to the speed of rotation of control unit 12 of FIGURE 1. A non-rotatable governor housing 21 has a valve guide 22 press fitted therein for rotatably supporting a drive gear 23. Drive gear 23 mates with a gear (not shown) driven at the speed of rotation of control unit 12 so as to be driven at a speed of rotation proportional to that of control unit 12. A governor spool valve 24 having spaced lands 25 and 26 is positioned in valve guide 22 for axial motion with respect to the guide. A stem 27 extends through gear 23. A circular spring 28 has one side thereof fixed to gear 23 by means of a pin 29 which extends through an axially extending boss 30 on gear 23 to pin the spring to the gear and also extends through a slot 31 formed in stem 27. The opposite side of circular spring 28 is fixed to stem 27 by means of pins 32 and 33. Spring 28 carries weights 34 and 35. An armature 36 extends through an annular solenoid 37 for axial motion with respect to solenoid 37. Armature 36 is disposed between one end of stem 27 and a series of bimetal strips 38 such that one end of armature 36 seats on a shoulder on stem 27 and the opposite end seats on strips 38. An end cap 39 detachably secured to housing 21 by bolts 40 retains the bimetal strips in assembled position in the assembly. Solenoid 37 may be connected to an electrical energy source through a lead 74 and control means hereafter described.

Valve guide 22 is provided with a series of ports 42, 43, 44. Fluid under pressure from a suitable source such as a power steering pump (not shown) may be supplied to port 42 through a passage 45. Port 43 communicates with a presure delivery passage 46 adapted to be connected to the servo of actuator unit 11 shown in FIGURE 1, by a pipe 47 shown in FIGURE 1. Port 44 is an oil return port for returning oil to the power steering pump.

Considering the operation of the governor, in general and in the absence of the control features hereafter to be described, at low speeds of rotation, land 26 will block off oil return port 44 and land 25 will permit oil flow from passage 45 to passage 46 by way of ports 42 and 43. At low speeds this pressure will be maximum. As the speed of rotation of gear 23 increases, weights 34, 35 will move outwardly, causing spring 28 to assume an elliptical rather than a circular shape. Stem 27 and valve 24 will move to block off port 42 and to connect port 43 to exhaust port 44. When this is accomplished, passages 46, 47 and the servo chamber of actuator unit 11 will be connected to exhaust. In between these two conditions of operation, the governor pressure delivered to passage 47 will decrease with increase in speed of rotation of the governor weights. At low speeds of rotation, pressure delivered to passage 47 to actuator unit 11 will condition the actuator unit to provide a 2 to 1 drive ratio of control unit 12 and the accessories driven thereby. At high speeds of governor rotation, above a predetermined speed, for example, 2000 r.p.m., no pressure will be delivered to passage 47 and the control unit will be driven at underdrive ratio of .75 to 1. This operation is the same as that described in my aforementioned application and is accomplished by the variable diameter pulleys 14 and 15 as described in said application.

As stated, it is desirable to prevent momentary overspeed of the engine accessories, particularly during periods of initial acceleration from a standing start. This is accomplished by energizing solenoid 37 by the control system shown schematically in FIGURE 3.

Referring to FIGURE 3, there is shown schematically a vehicle accelerator pedal 60 connected to a switch actuating plunger 52 by suitable linkage 51. A switch indicated generally at 53 is supported upon a fixed support 54 carrying a plunger guide member 55. Switch 53 includes a pair of spaced contacts 56 and 57 and a center contact 58 disposed therebetween, the contacts being carried by metal conductor spring leaves 59, 60, and 61, respectively, and having one end thereof fixed in an insulator 62 mounted on support 54. A battery 63 is connected to leaf 61 and contact 57 through a vehicle engine ignition coil 65 and wire leads 64 and 66. Thus, contact 57 will be energized only when the vehicle engine ignition switch is "on" for engine operation. Conductor 59 is connected to a ground 69 through a resistor element 68 by way of a lead 67. Lead 67 is also connected to a terminal 71 of a bimetal contact switch indicated generally at 70. A contact 72 carried by a strip 73 is connected to solenoid coil 37 by means of a lead 74.

In operation of the control system of FIGURE 3, assuming the vehicle engine ignition switch (not shown) is closed for engine operation, voltage is supplied to contact 57 of primary switch 53 which is normally open at closed throttle position of the accelerator pedal 50. More specifically, with accelerator pedal 50 in its engine idle or closed throttle position, contacts 58 and 57 are open. As the accelerator pedal 50 is moved from its closed throttle position to increase the engine speed in the order of 100 to 200 r.p.m. above engine idle speed contacts 58 and 57 close and current flows through the two parallel legs of lead 67. The parallel circuit is controlled by the resistor 68 and flows through contacts 71, 72 and bimetal strip 73 to solenoid coil 37 through lead 74 to actuate solenoid 36. With coil 37 energized, solenoid 36 forces stem 27 and governor valve 24 to a position wherein fluid will flow from governor pressure delivery port 43 to drain port 44, thereby reducing the pressure in passages 46, 47 and permitting the actuator unit to drive control unit 12 in underdrive. Current flowing through resistance 68 heats the bimetal member 73, and after a predetermined time, for example three seconds, after primary switch 53 is closed, the bimetal member 73 deflects to open contacts 71, 72 of switch 70. This interrupts the current supply to solenoid coil 37, and allows the governor spool valve 24 to assume its normal position as determined by the speed and responsive governor mechanism.

It will be noted that current will still be flowing through resistance 68 by way of contacts 56, 59 after switch 70 has been opened by deflection of bimetal strip 73. To stop the current flow through resistance 68 and to eliminate power dissipation the contact 56 is provided in switch 53. As the accelerator pedal is depressed slightly further toward an engine throttle opening position wherein the engine speed is increased to a range of 100 to 200 r.p.m. above engine idle speed, plunger 52 is moved downwardly, as viewed in FIGURE 3, or outwardly from guide 55 to permit contacts 57, 58 to close. Contacts 56, 58 will remain closed. With the accelerator pedal 50 depressed to a position wherein engine speed is increased to a range of 600 to 700 r.p.m. above idle speed, plunger 52 will have moved a sufficient distance to permit contact 58 to separate from contact 56. The time delay bimetal relay 70 limits the time period during which the solenoid coil 37 is energized so that the solenoid will not be held for an extended period of time in the underdrive position during light throttle positions within the limits of primary switch 53.

As heretofore stated, bimetal strips 38 provide a seat for solenoid plunger 36. As is well known, automotive carburetors are commonly provided with fast idle mechanisms effective when starting a cold engine to provide relatively fast engine idle speeds during engine warm-up. Such fast idle cams operate on the throttle linkage to prevent the opening of contacts 57, 58 of primary switch 53 during fast idle engine warm-up operation. To condition the control system for underdrive operation of the accessories during fast engine idle warm-up operation, the bimetal strips 38 are provided. Upon cold starting to warm up the engine, bimetal strips 38 will deflect to mechanically force solenoid plunger 36 and stem 27 to position governor valve 24 to its underdrive position wherein governor pressure delivery port 43 is connected to exhaust port 44. Upon engine warm-up, bimetallic strips 38 assume a non-deflected position to allow the spool valve to assume its normal position. When the temperatures are low, overdrive of the accessories is not required and the underdrive condition results in reduced parasitic horsepower consumption by the accessories. Bimetallic strips 38 are responsive to ambient temperature to maintain underdrive of the accessories so long as ambient temperature does not rise above a predetermined temperature. This temperature is preferably under the hood temperature or temperature of the engine compartment. It will be apparent that in a predetermined relatively cool range of temperatures, the bimetallic strips will position valve 24 at one end of its range of travel irrespective of the speed responsive flyweight action and also irrespective of the action of switch 53 and plunger 52. Also when the bimetallic strips are heated to a predetermined temperature, they will permit normal control of valve 24 by the speed responsive means or by switch 53 and solenoid 36 as the case may be. Strips 38 constitute a temperature responsive overcontrol for positioning valve 24 to connect port 43 to port 44 whenever the temperature of strips 38 lies in a range of temperature below a predetermined temperature. Upon rise of temperature of strips 38, the strips no longer control the position of valve 24 but permit control of the valve by governor weights 34, 35 or by solenoid 36 as the case may be.

It is apparent, therefore, that the position of valve 24 may be controlled by the temperature responsive means 38, by solenoid 36, or by the governor weights 34–35. The manually controlled switch 53 and plunger 52 are positioned when the accelerator pedal 50 is fully relaxed such that switch contacts 57, 58 are open and the solenoid is deenergized. Control of the position of valve 24 is by the governor weights. Upon initial movement of accelerator pedal 50 from its full throttle retarded position, plunger 52 permits 57, 58 to close to energize solenoid coil 37. As the accelerator pedal 50 is further depressed beyond a position corresponding to an engine speed of 100 to 200 r.p.m. above engine idle speed to a position corresponding to 600 to 700 r.p.m. above engine idle speed contact 58 separates from contact 56. In the position of the accelerator pedal corresponding to 100 to 200 r.p.m. above idle speed, the time delay relay 70 will, within a predetermined time, for example, three seconds after switch 53 is initially closed to energize solenoid coil 36, open contacts 71, 72 to deenergize solenoid coil 36. Thus, the control of the position of valve 24 by solenoid 36 upon initial movement of the accelerator pedal from a fully relaxed position is only momentary in that this control will be terminated after a predetermined time by relay 70. With relay contacts 71, 72 open, control of the position of valve 24 is returned to the speed responsive means of the governor. Likewise, when the accelerator pedal has been depressed to a position causing the engine to assume a speed greater than a predetermined speed, for example, 600 r.p.m. greater than idle speed, contacts 56, 58 of switch 53 will open to cut off lead 67 from battery 63. Thus, resistance 68 will be deenergized and contacts 71, 72 will close. However, at this time, contacts 56, 58 of switch 53 remain open due to the fact that plunger 52 is moved out of contact with spring leaf 60.

As shown in FIGURE 4, actuator unit 11 an extension of an engine crankshaft 75 carries a conventional vibration dampener 76 and drives an actuator unit power input shaft 77. Shaft 77 is rotatably supported in bearings 78. An actuator sleeve 79 is axially movable with respect to a body 80. A guide pin 81 on body 80 extends into opening 82 in sleeve 79 to prevent rotation of sleeve 79 and permits axial motion of sleeve 79 relative to body 80. An axially movable actuator pulley control sheave 83 has its hub 84 rotatably supported on a bushing 85 carried by shaft 77 and axially movable on shaft 77. Pulley 83 is further supported on sleeve 79 by a bearing 86. A pulley sheave 14 is fixed to shaft 77 by means of a washer 87 and bolt 88. Sleeve 79 and body 80 form a chamber 89 adapted to receive pressure from a passage 47 from governor 20 of FIGURE 2.

Accessory speed ratio control unit 12 and power steering pump 90 are driven by belt 13. Pump support housing 91 supports a shaft 93 by a bearing 92. Shaft 93 drives a gear 94 which mates with governor drive gear 23 of FIGURE 2, and also drives a pump impeller 95 of conventional construction. A pulley hub 96 keyed to shaft 93 by a pin 97 carries sheaves 16, 17, 18 shown in FIGURE 1, and a sheave 98. A second pulley sheave 99 fixed to a hub 100 is supported upon a bushing 101. A key 102 pins hub 100 to hub 96 but permits axial motion of sheave 99 with respect to hub 96. A spring seat 107 is supported on shaft 93 by a washer 108 and a nut 109.

Figure 5:
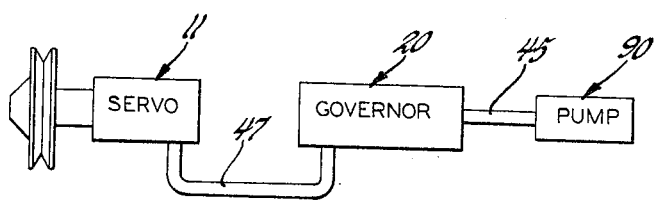
FIGURE 5 is a schematic diagram of the hydraulic system.

As heretofore explained, and as shown schematically in FIGURE 5, pump 90 delivers pressure to governor 20 through passage 45 and governor 20 delivers variable pressure to chamber 89 of servo actuator unit 11 through passage 47. At low governor speeds, pressure in passage 47 will be maximum and will condition the actuator unit to provide a 2 for 1 drive ratio of control unit 12. Pressure in passage 47 and chamber 89 decreases with increase in governor speed as heretofore explained until at some predetermined speed, for example 2000 r.p.m., no pressure will be delivered to passage 47 and the control unit will be driven at an underdrive ratio of .75 to 1.

What is claimed is:

1. In a variable ratio drive system of the type having a first variable diameter pulley driven by an engine and a second variable diameter pulley driven by said first pulley and having a fluid pressure responsive servo operatively associated with said first pulley adapted to receive fluid under pressure to vary the drive ratio of said system, a fluid pressure source, a governor connected to said source and to said servo for controlling the pressure of fluid delivered to said servo, said governor including speed responsive means driven by one of said pulleys and a valve controlled by said speed responsive means, said governor valve being normally movable throughout a predetermined range of motion in response to changes in speed of rotation of said speed responsive means to vary the pressure delivered to said servo, and valve control means for controlling the position of said governor valve independently of said speed responsive means, said valve control means including a manually actuated member movable throughout a range of motion from a first to a final position, said last-mentioned valve control means being effective upon movement of said manually actuated member to a position intermediate said first and final position to move said governor valve to one end of its range of movement independently of the action of said speed responsive means, said last-mentioned valve control being effective in said first and final positions of said manually actuated member to permit control of said governor valve by said speed responsive means.

2. In a variable ratio drive system of the type having a first variable diameter pulley driven by an engine and a second variable diameter pulley driven by said first pulley, said first pulley having a fluid pressure responsive servo adapted to receive fluid under pressure to vary the drive ratio of said system, a fluid pressure source, a governor connected to said source and to said servo for delivering variable pressure to said servo, said governor including speed responsive means driven by one of said pulleys and a valve normally controlled by said speed responsive means, said governor valve normally being movable throughout a range of motion in response to changes in speed of rotation of said speed responsive means to vary pressure delivered to said servo, first means for controlling the position of said governor valve independently of said speed responsive means, said first means including a manually actuated member movable throughout a range of motion from a first to a final position, said first valve control means being effective in said first and final position to permit said speed responsive means to control the position of said valve and effective in a position intermediate said first and final position to position said valve at one end of the range of motion of said valve, and additional temperature responsive means effective in a predetermined temperature range thereof to position said valve at said one end of the range of motion of said valve and effective in a second range of temperature to permit control of said valve by said speed responsive means.

3. In a variable ratio drive system of the type having a first variable diameter pulley driven by an engine and a second variable diameter pulley driven by said first pulley, a pressure responsive servo associated with said first pulley adapted to receive fluid under pressure to vary the drive ratio of said system, a fluid pressure source, a governor connected to said source and to said servo for controlling the pressure of fluid delivered to said servo, said governor including speed responsive means driven at a speed proportional to the speed of one of said pulleys and a valve controlled by said speed responsive means, said valve being movable throughout a predetermined range of motion in response to changes in speed of rotation of said speed responsive means to vary the pressure delivered to said servo, valve control means for controlling the position of said valve independently of said speed responsive means, said valve control means including a manually movable control member movable throughout a range of movement, said valve control means being effective upon movement of said manually controlled member to a predetermined position in said range of movement to position said valve in a predetermined position independently of said speed responsive means, and time delay means operable upon a predetermined time lapse after movement of said manually movable member to said predetermined position of said manually controlled member to return control of the position of said valve from said manually controlled member to said speed responsive means.

4. In a variable ratio drive system of the type having a first variable diameter pulley driven by an engine and a second variable diameter pulley driven by said first pulley, a pressure responsive servo associated with said first pulley adapted to receive fluid under pressure to vary the drive ratio of said system, a fluid pressure source, a governor connected to said source and to said servo for controlling the pressure of fluid delivered to said servo, said governor including speed responsive means driven at a speed proportional to the speed of one of said pulleys and a valve normally controlled by said speed responsive means, said valve being movable by said speed responsive means throughout a range of movement to vary the pressure delivered to said servo, valve control means for controlling the position of said valve independently of said speed responsive means, said valve control means including a manually movable control member movable throughout a range of movement, said valve control means being effective upon movement of said manually controlled member to a predetermined position to position said valve in a predetermined position independently of said speed responsive means, time delay means operable upon a predetermined time lapse after movement of said manually movable member to said predetermined position of said manually controlled member to return control of the position of said valve from said manually controlled member to said speed responsive means, and temperature responsive means effective in a predetermined temperature range to position said valve in a predetermined position independently of the action of said speed responsive means and of said manually controlled member.

5. In a variable ratio drive system of the type having a first variable diameter pulley driven by an engine and a second variable diameter pulley driven by said first pulley, a fluid pressure responsive servo adapted to receive fluid under pressure to vary the drive ratio of said system, a fluid pressure source, a governor connected to said source and to said servo for controlling the pressure delivered to said servo, said governor including speed responsive means driven at a speed proportional to the speed of rotation of one of said pulleys and a valve controlled by said speed responsive means, said valve being movable throughout a range of motion in response to changes in speed of rotation of said speed responsive means to vary the pressure delivered to said servo, a solenoid associated with said valve effective when energized to position said valve in a predetermined position, and means for controlling energization of said solenoid valve including a switch having a movable member and manually controlled means for controlling the position of said movable switch member, said switch being effective in a first position of said manually controlled means to deenergize said solenoid, said switch member being effective upon movement of said manually controlled means to a second position to energize said solenoid, said switch being effective upon further movement of said manually controlled means to a third position to deenergize said solenoid.

6. In a variable ratio drive system of the type having a first variable diameter pulley driven by an engine and a second variable diameter pulley driven by said first pulley, a fluid pressure responsive servo adapted to receive fluid under pressure to vary the drive ratio of said system, a fluid pressure source, a governor connected to said source and to said servo for controlling the pressure delivered to said servo, said governor including speed responsive means driven at a speed proportional to the speed of rotation of one of said pulleys and a valve controlled by said speed responsive means, said valve being movable throughout a range of motion in response to changes in speed of rotation of said speed responsive means to vary the pressure delivered to said servo, a solenoid associated with said valve effective when energized to position said valve in a predetermined position, and means for controlling energization of said solenoid valve including a switch having a movable member and manually controlled means for controlling the position of said movable switch member, said switch being effective in a first position of said manually controlled means to deenergize said solenoid, said switch member being effective upon movement of said manually controlled means to a second position to energize said solenoid, and time delay means operable upon a predetermined time lapse after energization of said solenoid to deenergize said solenoid.

7. In a variable ratio drive system of the type having a first variable diameter pulley driven by an engine and a second variable diameter pulley driven by said first pulley, a fluid pressure responsive servo adapted to receive fluid under pressure to vary the drive ratio of said system, a fluid pressure source, a governor connected to said source and to said servo for controlling the pressure delivered to said servo, said governor including speed responsive means driven at a speed proportional to the speed of rotation of one of said pulleys and a valve controlled by said speed responsive means, said valve being movable throughout a range of motion in response to changes in speed of rotation of said speed responsive means to vary the pressure delivered to said servo, a solenoid associated with said valve effective when energized to position said valve in a predetermined position, and means for controlling energization of said solenoid valve including a switch having a movable member and manually controlled means for controlling the position of said movable switch member, said switch being effective in a first position of said manually controlled means to deenergize said solenoid, said switch member being effective upon movement of said manually controlled means to a second position to energize said solenoid, and time delay means operable upon a predetermined time lapse after energization of said solenoid to deenergize said solenoid, said manually controlled means being movable to a third position to deenergize said time delay means.

8. In a variable ratio drive system of the type having a first variable diameter pulley driven by an engine and a second variable diameter pulley driven by said first pulley, a fluid pressure responsive servo associated with one of said pulleys adapted to receive fluid under pressure to vary the drive ratio of said system, a fluid pressure source, a governor connected to said source and to said servo for controlling the pressure delivered to said servo, said governor including speed responsive means driven at a speed proportional to the speed of rotation of one of said pulleys and a valve controlled by said speed responsive means, said valve being movable throughout a range of motion to vary the pressure delivered to said servo, a solenoid associated with said valve effective when energized to position said valve in a predetermined position, a source of energy, a manually controlled switch connected to said energy source, time delay means intermediate said switch and said solenoid, said switch being effective in a first position to deenergize said time delay means and said solenoid, said switch being effective in a second position to energize said solenoid through said time delay means, said time delay means being effective upon a predetermined time lapse after movement of said switch to said second position to deenergize said solenoid, said switch being movable to a third position to deenergize said time delay means and to maintain said solenoid deenergized.

9. In a variable ratio drive system of the type having a first variable diameter pulley driven by an engine and a second variable diameter pulley driven by said first pulley, a fluid pressure responsive servo associated with one of said pulleys adapted to receive fluid under pressure to vary the drive ratio of said system, a fluid pressure source, a governor connected to said source and to said servo for controlling the pressure delivered to said servo, said governor including speed responsive means driven at a speed proportional to the speed of rotation of one of said pulleys and a valve controlled by said speed responsive means, said valve being movable throughout a range of motion to vary the pressure delivered to said servo, a solenoid associated with said valve effective when energized to position said valve in a predetermined position, a source of energy, a manually controlled switch connected to said energy source, time delay means intermediate said switch and said solenoid, said switch being effective in a first position to deenergize said time delay means and said solenoid, said switch being effective in a second position to energize said solenoid through said time delay means, said time delay means being effective upon a predetermined time lapse after movement of said switch to said second position to deenergize said solenoid, said switch being movable to a third position to deenergize said time delay means and to maintain said solenoid deenergized, and temperature responsive means operable in a predetermined range of temperature thereof for positioning said valve in a predetermined position irrespective of the position of said switch.

10. In a variable ratio drive system of the type having a first variable diameter pulley driven by an engine and a second variable diameter pulley driven by said first pulley, a fluid pressure responsive servo associated with one of said pulleys adapted to receive fluid under pressure to vary the drive ratio of said system, a governor connected to said source and to said servo for controlling the pressure of fluid delivered to said servo, said governor including speed responsive means driven by one of said pulleys and a valve controlled by said speed responsive means, said valve being movable throughout a range of motion to vary the pressure delivered to said servo, a solenoid operably connected to said valve effective when energized to position said valve in a predetermined position, a source of energy, a switch connected to said energy source, time delay means operably connected to said switch and said solenoid, said switch being effective in a first position to deenergize said time delay means and said solenoid, said switch being effective in a second position to energize said solenoid through said time delay means, said time delay means being effective upon a predetermined time lapse after movement of said switch to said second position to deenergize said solenoid, said switch being movable to a third position to deenergize said time delay means and to maintain said solenoid deenergized, and manually operable means including an accelerator pedal for selectively positioning said switch in said first, second or third positions.

References Cited by the Examiner
UNITED STATES PATENTS 2,731,849 1/1956 Rockwood et al.
3,019,666 2/1962 Brennan et al. _____ 74—472

DAVID J. WILLIAMOWSKY, *Primary Examiner.*

J. A. WONG, *Assistant Examiner.*